April 13, 1965   J. W. TUMAVICUS ETAL   3,177,928
REGENERATIVE HEAT EXCHANGER
Filed April 26, 1962   4 Sheets-Sheet 1

INVENTORS
JULIUS W. TUMAVICUS
BY KENNETH W. SAWYER

Charles Warren
ATTORNEY

INVENTORS
JULIUS W. TUMAVICUS
BY KENNETH W. SAWYER

ATTORNEY

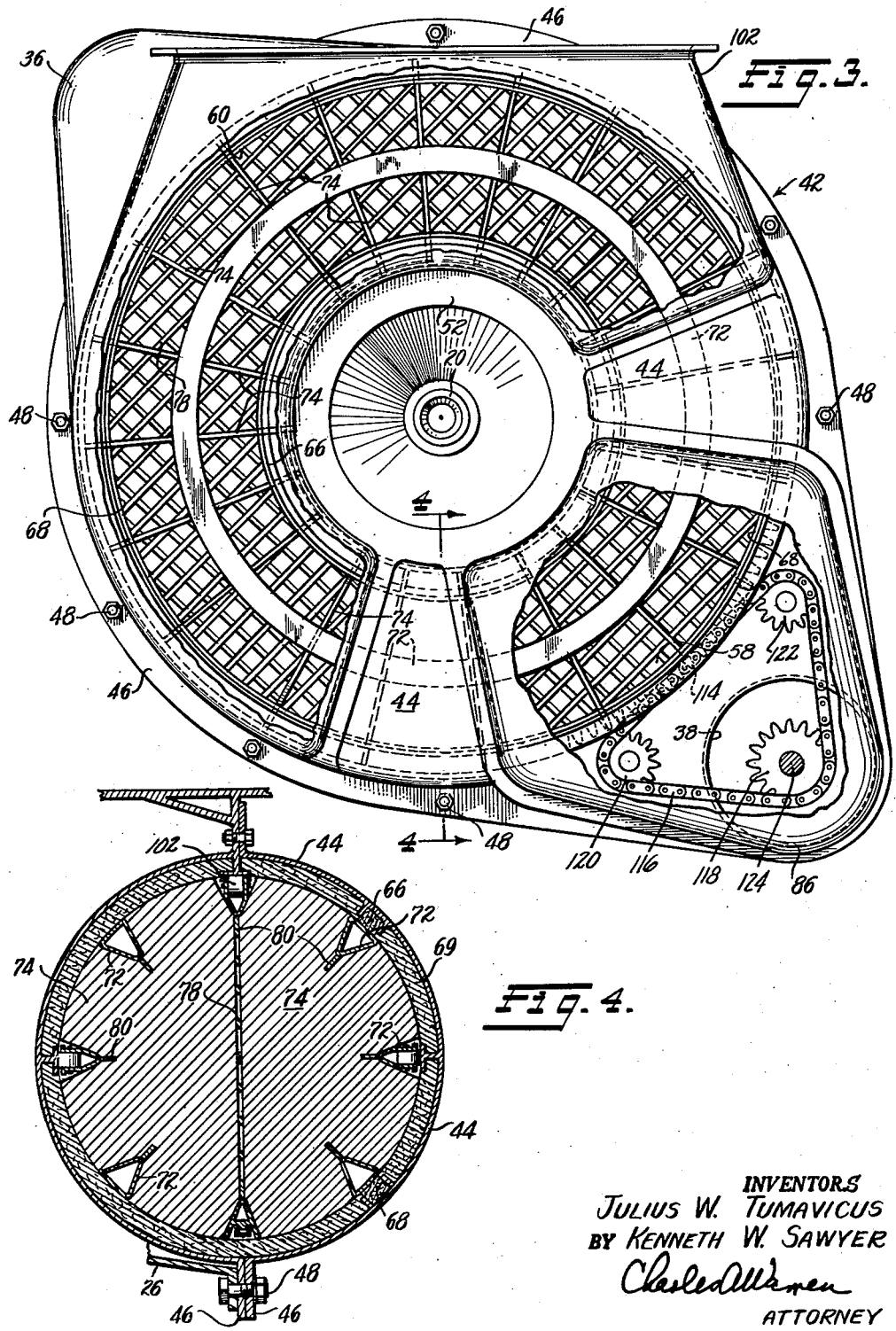

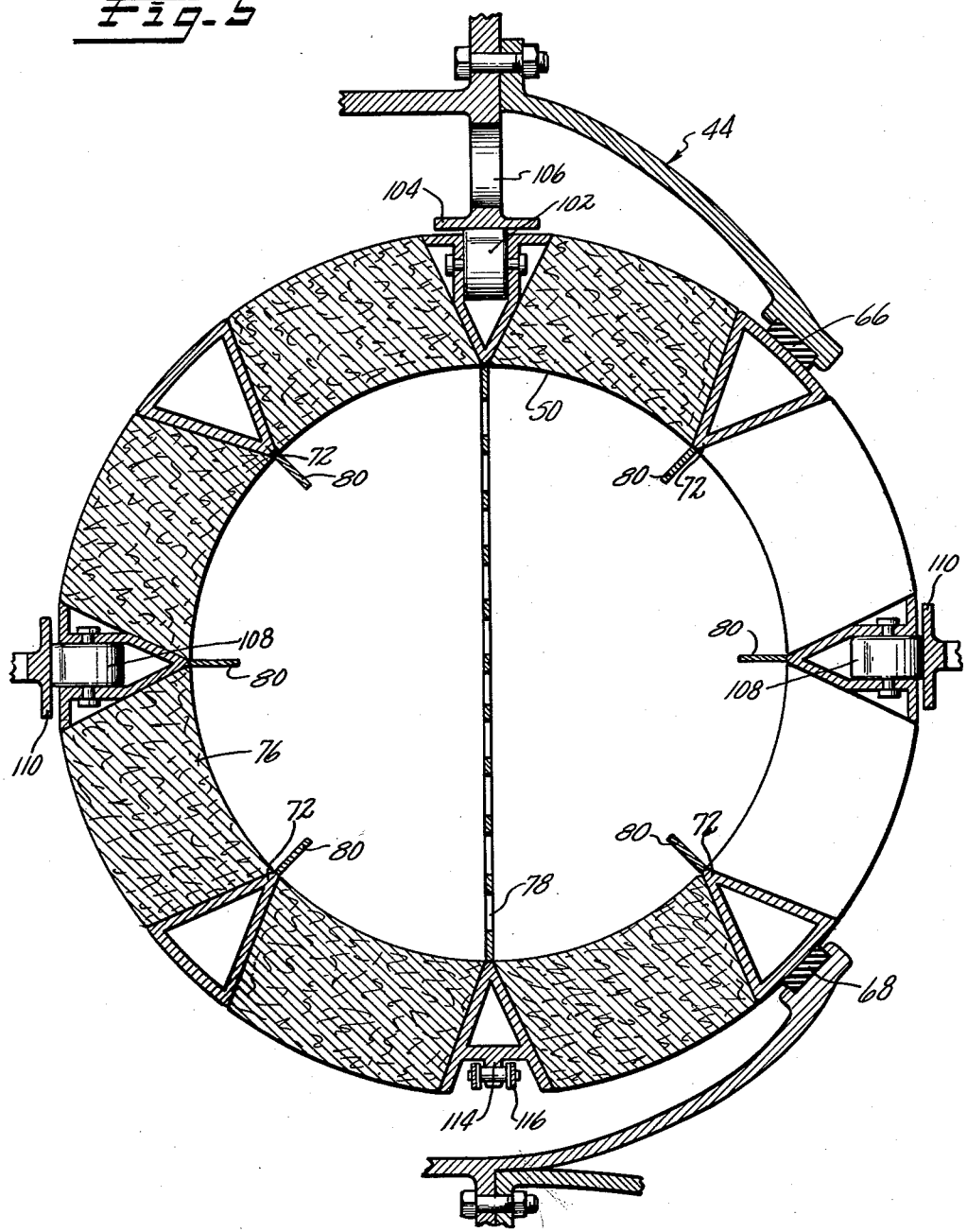

United States Patent Office 3,177,928
Patented Apr. 13, 1965

3,177,928
REGENERATIVE HEAT EXCHANGER
Julius W. Tumavicus, Old Saybrook, and Kenneth W. Sawyer, Thompsonville, Conn., assignors to United Aircraft Corporation, East Hartford, Conn., a corporation of Delaware
Filed Apr. 26, 1962, Ser. No. 190,300
4 Claims. (Cl. 165—7)

This invention relates to power plants, and more specifically to a novel heat exchanger of the regenerative type, particularly adapted for use with a combustion gas turbine.

Heat exchangers generally fall into two broad types, (1) surface types, wherein separate flow passages are provided for the heating fluid and for the fluid to be heated, and (2) regenerative types, wherein a mass of material, having a relatively large heat coefficient, is alternately heated by a hotter fluid and gives up its heat to a cooler fluid. Each type has its advantages and its disadvantages. The surface type is best suited where no intermixing of the heating fluid and the fluid to be heated is permitted, but, for high efficiencies, requires numerous passages and large areas of heat transfer walls. Where pressure differences between the heating fluid and the fluid to be heated are not excessive, and where some intermixing can be tolerated, the regenerative type is preferable, providing high rates of heat transfer with less expensive equipment.

It is an object of this invention to provide a novel arrangement of combustion gas turbine and heat exchanger requiring short interconnecting ducting with a minimum amount of piping and plumbing, and providing a high efficiency of heat exchange.

It is a further object to provide a novel regenerative heat exchanger having unusually large heat exchange capacity disposed in a minimum volume.

It is a still further object to provide a regenerative type heat exchanger having novel structural features producing a light weight and rigid construction.

It is a still further object to provide a novel regenerative heat exchanger having a large heat exchange capacity offering a minimum resistance to fluid flow.

It is a still further object to provide a novel regenerative heat exchanger of the rotary type operating with a relatively high degree of efficiency and economical to manufacture, and to maintain.

In general, the novel regenerative heat exchanger comprises a hollow, ring-shaped or annular, rotary regenerator employing a number of matrix packages of high heat capacity material mounted on the end of a combustion gas turbine, and having connections with the air supply and exhaust ducts. During rotation the matrix material alternately passes through the path of flow of the hot exhaust gases whereby the matrix material is heated, and thence through the path of flow of the cooler compressed air discharged from the compressor, whereby the matrix material gives up its heat while heating the air delivered to the combustion chamber or chambers. The rotating regenerator is annular, and is C-shaped in transverse cross section, and the hollow interior thereof is divided, by a series of transversely disposed, uniformly spaced, partitions or bulkheads, into a number of flow paths having arcuate sections of matrix material to be alternately heated and cooled as the regenerator is rotated within its housing.

A clearer understanding of the invention and its advantages can be gained from a consideration of the following specification and the accompanying drawings, disclosing a preferred embodiment, wherein:

FIG. 3 is an end view of the regenerator with parts broken away for clarity; and FIG. 4 is a transverse sectional view through the regenerator taken on the line 4—4 of FIG. 3, and FIG. 5 is a sectional view on a larger scale of a portion of the regenerator of FIG. 1.

Figure 1:
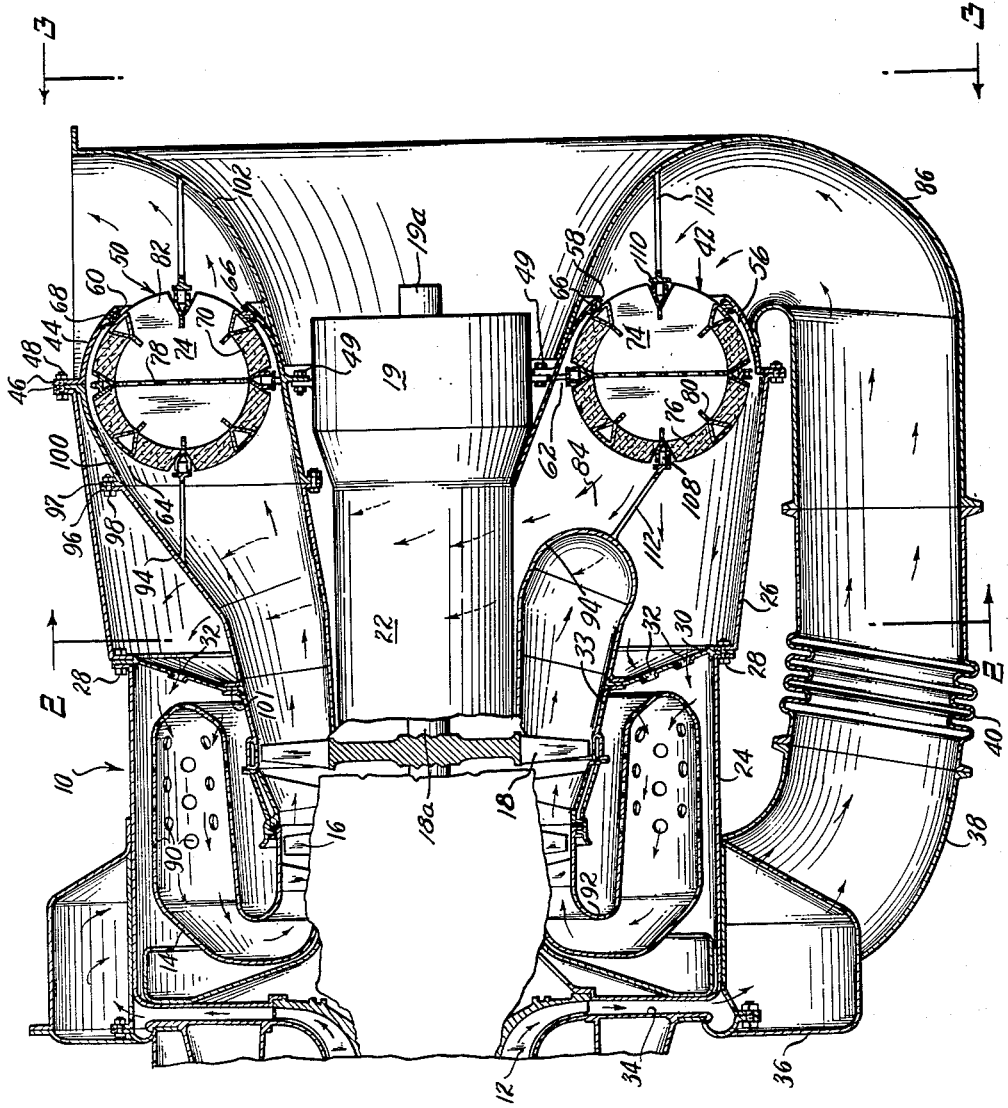
FIG. 1 is a partial view, in section, on the line 1—1 of FIG. 2, through a combustion gas turbine and regenerator according to the invention.

In the following description, referring to the accompanying drawings wherein corresponding elements in the several views are designated by the same numerals, the power plant is designated in its entirety as 10 and comprises a centrifugal compressor 12, a combustion chamber 14, a high pressure turbine rotor 16 and a low pressure turbine rotor 18 mounted on a shaft 18a. Only so much of the power plant is illustrated as required to fully disclose the invention. As is usual in the art, the compressor 12 and high pressure rotor 16 may be mounted on a common shaft, not shown, and the low pressure rotor 18 may be mounted on an independent shaft 18a connected, through a gear box 19 to a power output shaft 19a.

An inner housing 22 surrounds a shaft 20 in spaced relation thereto, and a pair of outer housings 24 and 26 surround the inner housing 22 in spaced relation therewith, the outer housings 24 and 26 being secured together, in end to end relation, by a series of bolts 28 passing through holes in adjacent flanges. A transverse partition 30, having a series of openings 32 therein, is held in position between the outer housings 24 and 26 by the bolts 28 which pass through holes in the outer periphery of the partition. The inner periphery of the partition 30 engages a groove in the outer surface of an exhaust duct 33.

The compressed air discharged from the compressor 12 passes through a diffuser 34 and thence through a scroll 36 surrounding the outer housing 24. From the scroll 36, the air passes through a duct 38 having an expansion joint 40 therein, through a regenerator 42 and into the interior of the housing 26. The diffuser 34, scroll 36, duct 38, and the space between the inner housing 22 and the outer housings 24 and 26 define a system of ducting interconnecting the compressor 12 and the combustion chamber of the power plant, as will be explained more fully hereinafter.

The regenerator 42 includes a two-part housing 44 having external flanges 46 secured by a series of bolts 48 to a flange on the end of the outer housing 26. One part of the housing 44 includes an inner flange secured to the end of the inner housing 22 by a series of screws 49.

Figure 2:
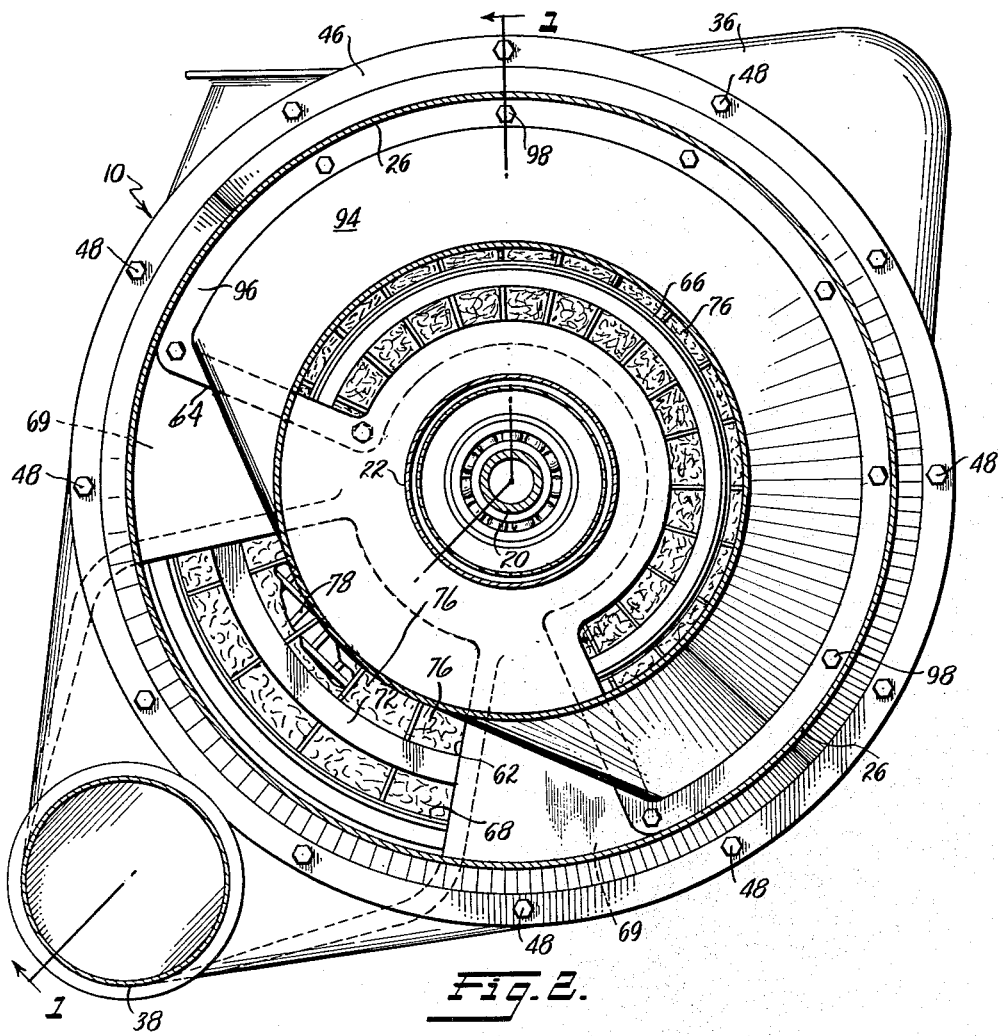
FIG. 2 is a vertical sectional view through the connecting ducting taken on the line 2—2 of FIG. 1.

The regenerator 42 also includes a hollow annular rotor 50 mounted for rotation. The housing 44 is a generally ring-shaped or annular structure encompassing an annular chamber 56 of circular cross section accommodating the rotor 50. One end wall of the housing 44 includes an arcuate air inlet opening 58 supplied with air by duct 38 and a circumferentially spaced arcuate exhaust gas discharge opening 60. The other end wall of the housing 44 includes an arcuate air discharge opening 62 of equal circumferential extent to the opening 58 and a correspondingly spaced arcuate exhaust gas inlet opening 64 of equal circumferential extent to the opening 58. As seen in FIGS. 2 and 3, the openings 58 and 62 extend approximately 70° arcuately and are axially aligned, and the openings 60 and 64 are also axially aligned with each other and extend arcuately approximately 225°, although this particular dimension is not critical. A pair of annular seals 66 and 68, carried by the housing 44, cooperate with the rotor 50 to prevent leakage of fluid around rotor 50 from opening 58 to opening 62 and from opening 64 to opening 60. Transverse circular seals 69, FIG. 4, carried by the housing 44 and surrounding the rotor 50, and disposed between the openings in the housing, prevent leakage of fluid from the ends of the openings.

The regenerator rotor 50 is generally hollow, forming a ring-shaped cavity 70. To provide lightness and rigidity, the regenerator rotor includes a skeleton framework comprising a series of uniformly spaced, hollow, annular rings 72 of triangular cross section, arranged in a circle concentrically about the axis of the regenerator, as seen in FIG. 1. A series of uniformly spaced partitions 74 are disposed within the cavity 70, extending transversely thereof, the partitions being secured to the annular rings as by welding, brazing, soldering, etc., to provide a light unitary structure. As seen in FIG. 3, the partitions 74 are angularly spaced apart, providing a plurality of arcuate chambers or flow passages between the partitions. It is evident that a greater number or a fewer number of partitions may be provided except that, for preventing circumferential linkage the partitions should be at least as close together as the circumferential dimension of the seal 69 which extends from one radial edge of opening 58 to the adjacent radial edge of opening 60.

The greater part of the space between successive partitions and the rings 72 is filled with heat absorbing matrix packages 76. Each package 76 is of a size and shape which can be forcibly wedged into the arcuate spaces in the regenerator rotor 50 formed by the rings 72 on each side and the partitions 74 on each end.

A shear truss 78 is mounted within the maximum flow area section of the cavity 70 of the regenerator rotor 50, being connected with the largest diameter ring and the smallest diameter ring 72, to give added rigidity to the structure. Each partition 74 may be made in two parts, one part being disposed on each side of the shear truss and connected thereto. The shear truss 78 is designed as an open-work lattice structure to afford strength and yet provide a minimum obstruction to the flow of fluid through the regenerator.

Baffles 80 are connected with the apexes or inner ends of the rings 72, as shown in FIG. 4, to assist in fluid flow and distribution.

The regenerator rotor 50 is supported within the chamber 56 by rollers 102 mounted in the smallest diameter ring 72 at circumferentially spaced points and in a position to engage a supporting guide ring 104 carried by struts 106 connected to the adjacent duct structure. Other rollers 108 carried in each of the rings 72 located on the horizontal diameter of the circular section of the regenerator engage cooperating supporting rings 110, also supported by struts 112 from adjacent portions of the ducting, as shown in FIG. 1.

In the largest diameter ring 72, FIG. 5, is positioned a ring sprocket 114 and this sprocket is engaged by a chain 116, FIG. 3, carried over a drive sprocket 118 and idler sprockets 120 and 122. The drive sprocket 118 is on the shaft 124 of a drive motor so that the rotation of the regenerator may be controlled as desired.

With further reference to FIG. 1, it should be noted that the matrix packages 76 are placed in the spaces between seven consecutive annular rings 72, while the spaces between three consecutive rings are left open, and that the open spaces register with the openings 58 and 60. In transverse section, therefore, the matrix material of the regenerator rotor is in the shape of the letter C, and the opening in the C, designated 82, is annular in form and is subdivided circumferentially by the annular ring 72. The partitions 74 divide the annular cavity 70 into a series of separate arcuate flow passages, each having an inlet or an outlet by way of the opening 82, and an outlet or an inlet by way of the interstices in the matrix material in the packages 76. The area occupied by the matrix material is three times the area of the opening 82, and as a result, a flow of fluid through the matrix material will travel at a much slower rate than through the opening 82.

The matrix material in the packages 76 is selected from a suitable metal or composition having a high heat absorption coefficient, so that, during rotation of the regenerator rotor 50, the material will absorb a large quantity of heat from the hot exhaust gases which pass therethrough in one direction, and will give up the heat to the compressed air passing through the regenerator in the opposite direction.

The heated air leaving the regenerator 42 discharges into a plenum 84 defined by the inner housing 22 and the outer housing 26, whence the air flows through the openings 32 in the partition 30 and through a series of openings 90 in the wall of the combustion chamber 14 to be mixed with fuel and burned therein.

The system of ducting between the air compressor and the combustion chamber includes a U-bend section 86, in which the compressed air is turned through 180° to flow through the regenerator from right to left, as viewed in FIG. 1.

The combustion chamber 14 may comprise a single annular chamber, or a series of combustors as is conventional in the art. The combustion products and the diluent air leaving the combustion chamber 14 are reversed in direction of flow in passing through a U-bend 92 which directs the combustion products and diluent air through the high pressure turbine rotor 16 and low pressure turbine rotor 18 in series. The exhaust gases leaving the turbine rotors 16 and 18 flow through an exhaust duct 94 encompassed within the annular space defined by the inner housing 22 and the outer housings 24 and 26, the exhaust duct 94 being attached to a short duct 100 by a series of bolts 98 passing through a flange 96 on the end of the duct 94 and an abutting flange 97 on the duct 100. The exhaust duct 94 changes from a ring shaped cross section at its connection with the low pressure turbine rotor to an arcuate cross section at its other end connected with the short duct 100. The short duct 100 engages the outer wall of the regenerator housing 44 surrounding the exhaust gas inlet opening 64 to prevent mixing of the exhaust gases with the air.

The left hand end of the exhaust duct 94 is provided with a circumferential groove 101 to receive the inner edge of the partition 30.

In operation, the compressed air discharged from the compressor 12 is delivered through the diffuser 34, scroll 36, duct 38, U-bend 86 and air inlet opening 58 of the regenerator. The rotor 50 of the regenerator, attached to the shaft 20, is slowly rotated by the drive mechanism, above described, whereby the matrix packages 76 are alternately exposed to the flow of hot exhaust gases and the cooler compressed air. The compressed air entering the air inlet opening 58 passes through the opening 82 and into the cavity 70 of the hollow regenerator rotor 50, and thence through the interstices of the matrix packages to absorb heat from the matrix material while cooling the latter. The heated air enters the plenum 84, thence through the openings 32 in the partition 30 and into the combustion chamber 14. The exhaust gases leaving the turbine rotors 16 and 18 are delivered by the exhaust duct 94 and short duct 100 through the exhaust gas inlet opening 64 and through the interstices of the matrix material of the matrix packages 76 whereby the matrix material is heated and the exhaust gases are cooled. The cooled exhaust gases are discharged from the hollow cavity 70 of the rotor 50 through the opening 82, exhaust gas discharge opening 60 and an exhaust gas discharge 102 to the atmosphere or other point of discharge.

As indicated by the arrows in FIG. 1, the compressed air, in its passage from the regenerator to the combustion chamber, flows about the exhaust duct 94 in which the hot exhaust gases flow in the opposite direction from the turbine to the regenerator, whereby heat exchange takes place between the air and the exhaust gases.

From the above description, it is evident that the invention provides a very compact structure permitting a very efficient heat exchange between the exhaust gases and the compressed air, resulting in a high efficiency power plant.

Having fully described our invention, it is to be understood that we do not wish to be limited to the details set forth herein, but that various changes may be made in the details and proportions without departing from the principles of the invention or from the scope of the annexed claims.

We claim:

1. A regenerative heat exchanger, comprising: an annular housing; flow passages connected with said housing for the flow of heating and heated fluid through said housing; an annular regenerator having matrix material therein disposed within said housing, said regenerator including a series of spaced partitions extending transversely thereof providing a pluraltiy of separate arcuate flow passages for the heating and heated fluids; and means supporting said regenerator for rotatable movement in said housing, the matrix material being C-shaped in a transverse cross section of the regenerator, one of said flow passages communicating with the interior of the regenerator through the open portion of the C, and in which another passage communicates with the exterior of the regenerator.

2. A regenerative heat exchanger as defined in claim 1, in which said regenerator includes a series of spaced rings concentrically disposed about the axis of said regenerator, said partitions being connected to and held in spaced relation to one another by said rings.

3. A regenerative heat exchanger as defined in claim 1, in which said regenerator includes a series of spaced rings concentrically disposed about the axis of said regenerator, said partitions being connected with said rings, and said matrix material comprising a plurality of matrix packages disposed between the partitions and located between the rings.

4. A regenerative heat exchanger as defined in claim 3, in which said regenerator includes an annular perforated shear truss lying in the diametral plane of said regenerator and connected with opposed rings and with said partitions.

References Cited by the Examiner

UNITED STATES PATENTS

| | | | |
|---|---|---|---|
| 1,652,025 | 12/27 | Ljungstrom | 165—9 |
| 2,469,758 | 5/49 | Alcock | 165—7 |
| 2,503,651 | 4/50 | Alcock | 165—8 |
| 2,764,340 | 9/56 | Jendrassik | 230—69 |
| 3,039,265 | 6/62 | Williams et al. | 60—39.51 |

CHARLES SUKALO, *Primary Examiner.*